(12) United States Patent
Henry (10) Patent No.: US 10,405,478 B2
(45) Date of Patent: Sep. 10, 2019

(54) AGRICULTURAL IMPLEMENT HYDRAULIC REPHASING UNIT AND METHOD

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 44 days.

(21) Appl. No.: 15/358,914

(22) Filed: Nov. 22, 2016

(65) Prior Publication Data

US 2018/0139890 A1 May 24, 2018

(51) Int. Cl.
*A01B 63/22* (2006.01)
*A01B 73/02* (2006.01)
*A01B 49/02* (2006.01)

(52) U.S. Cl.
CPC .............. *A01B 63/22* (2013.01); *A01B 73/02* (2013.01); *A01B 49/02* (2013.01)

(58) Field of Classification Search
CPC .......... A01B 63/10; A01B 63/22; A01B 63/32
USPC ..................................................... 172/2, 663
See application file for complete search history.

(56) References Cited

U.S. PATENT DOCUMENTS

| | | | | |
|---|---|---|---|---|
| 4,293,040 A | * | 10/1981 | O'Connor | A01B 63/112 172/7 |
| 4,434,857 A | | 3/1984 | Basrai | |
| 4,463,811 A | * | 8/1984 | Winter | A01B 69/004 172/26 |
| 5,427,182 A | | 6/1995 | Winter | |
| 5,449,042 A | | 9/1995 | Landphair et al. | |
| 6,076,611 A | * | 6/2000 | Rozendaal | A01B 63/22 172/2 |
| 6,164,385 A | | 12/2000 | Buchl | |
| 6,216,795 B1 | | 4/2001 | Buchl | |
| 6,510,628 B1 | | 1/2003 | Koch | |
| 6,615,114 B1 | | 9/2003 | Skiba et al. | |
| 8,162,070 B2 | * | 4/2012 | Smith | G05D 19/02 172/2 |
| 8,555,635 B2 | | 10/2013 | Webster et al. | |
| 8,657,026 B2 | | 2/2014 | Friesen | |
| 9,247,687 B2 | * | 2/2016 | Gray | A01B 61/044 |
| 9,763,375 B2 | * | 9/2017 | Townsend | A01C 7/205 |
| 2014/0060862 A1 | | 3/2014 | Gilstring | |
| 2015/0021059 A1 | | 1/2015 | Hennes | |

(Continued)

OTHER PUBLICATIONS

"Getting Your System in Sync Part 2", Kenneth D. Rosenbecker, Energy Mfg. Co., Jul. 13, 2006 (4 pages).

*Primary Examiner* — Gary S Hartmann
(74) *Attorney, Agent, or Firm* — Rebecca L. Henkel; Rickard K. DeMille (57) ABSTRACT

An agricultural implement including a frame, a hydraulic system, a controller and a plurality of sensors. The hydraulic system is coupled to the frame and has a plurality of hydraulic actuators fluidically coupled in a series arrangement. The controller is in control of the hydraulic system. The plurality of sensors have at least one sensor coupled to each of the plurality of hydraulic actuators. The sensors are in communication with the controller, with the controller executing the steps of receiving at least one signal from the sensors indicating a need to rephase the hydraulic actuators; and operating the hydraulic system to rephase the hydraulic actuators dependent upon the signal.

9 Claims, 6 Drawing Sheets

(56) References Cited

U.S. PATENT DOCUMENTS

2017/0273231 A1\* 9/2017 Nolte .................... A01C 7/208
2018/0139889 A1\* 5/2018 Henry .................... A01B 63/22

\* cited by examiner

AGRICULTURAL IMPLEMENT HYDRAULIC REPHASING UNIT AND METHOD

BACKGROUND OF THE INVENTION

1. Field of the Invention

The present invention relates to agricultural implements, and, more particularly, to a system that rephases series hydraulic cylinders of an agricultural implement.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Tillage equipment prepares the soil by way of mechanical agitation of various types, such as digging, stirring, and overturning. Examples of which include ploughing (overturning with moldboards or chiseling with chisel shanks), rototilling, rolling with cultipackers or other rollers, harrowing, and cultivating with cultivator shanks.

The lifting of the tillage elements from the field, and the folding of the sections are typically actuated with a hydraulic system. Hydraulic systems that utilize a pressurized fluid through a series of pistons is generally known. Typically, it is important to have the pistons of a series arrangement synchronized with respect to one another. Synchronization of the system is accomplished by having the pistons reach the top and the bottom of their respective strokes at the same time. This is especially desirable when raising and lowering components of a piece of equipment.

During operation of the hydraulic system the pistons may get out of sync due to imperfections in the pistons/cylinders and due to wear of various parts on the pistons and cylinders. Most commonly, seals can wear and begin to degrade over time, thereby allowing the hydraulic fluid within the system to bypass the pistons and/or leak out of the system. When the fluid is removed from the system or becomes unbalanced, by leaking or otherwise, a decrease in pressure within the system occurs causing the pistons to travel by differing amounts or by a varying speed, thereby causing the pistons to begin and end their strokes at different times. During the raising and lowering of the components of the equipment, the variation in piston movement will not allow the components to move smoothly and safely. To remedy this problem, the pistons need to be resynced. The process of resyncing the pistons in the series hydraulic system is commonly known as rephasing.

The typical way to rephase hydraulic systems require an operator to notice the need to rephase, and the operator then causes the system to fully extend the hydraulic actuators to allow the built in fluid channels to adjust the fluid present between the pistons.

A problem with these systems is that the operation requires the operator to note the need and to execute the sequence.

What is needed in the art is a system that will detect the need for rephasing and select a time that is energy efficient and not when the implement is performing its primary duty.

SUMMARY OF THE INVENTION

The present invention provides a rephasing solution for serially arranged actuators.

The invention in one form is directed to an agricultural implement including a frame, a hydraulic system and a controller. The hydraulic system is coupled to the frame. The hydraulic system has a plurality of hydraulic actuators fluidically coupled in a series arrangement. The implement has a transport mode, a headland mode and a ground engaging mode. The controller is in control of the hydraulic system, and executes the steps of detecting that the implement is in the transport mode or the headland mode; and operating the hydraulic system to rephase the hydraulic actuators dependent upon the detection of the transport mode or the headland mode in the detecting step.

The invention in another form is directed to an agricultural implement including a frame, a hydraulic system, a controller and a plurality of sensors. The hydraulic system is coupled to the frame and has a plurality of hydraulic actuators fluidically coupled in a series arrangement. The controller is in control of the hydraulic system. The plurality of sensors have at least one sensor coupled to each of the plurality of hydraulic actuators. The sensors are in communication with the controller, with the controller executing the steps of receiving at least one signal from the sensors indicating a need to rephase the hydraulic actuators; and operating the hydraulic system to rephase the hydraulic actuators dependent upon the signal.

An advantage of the present invention is that a less skilled operator can be used to operate the agricultural implement.

Another advantage is that the present invention detects when rephasing should be undertaken.

Yet a further advantage is that the present invention delays the rephasing until an opportune time, such as during a headlands turn.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
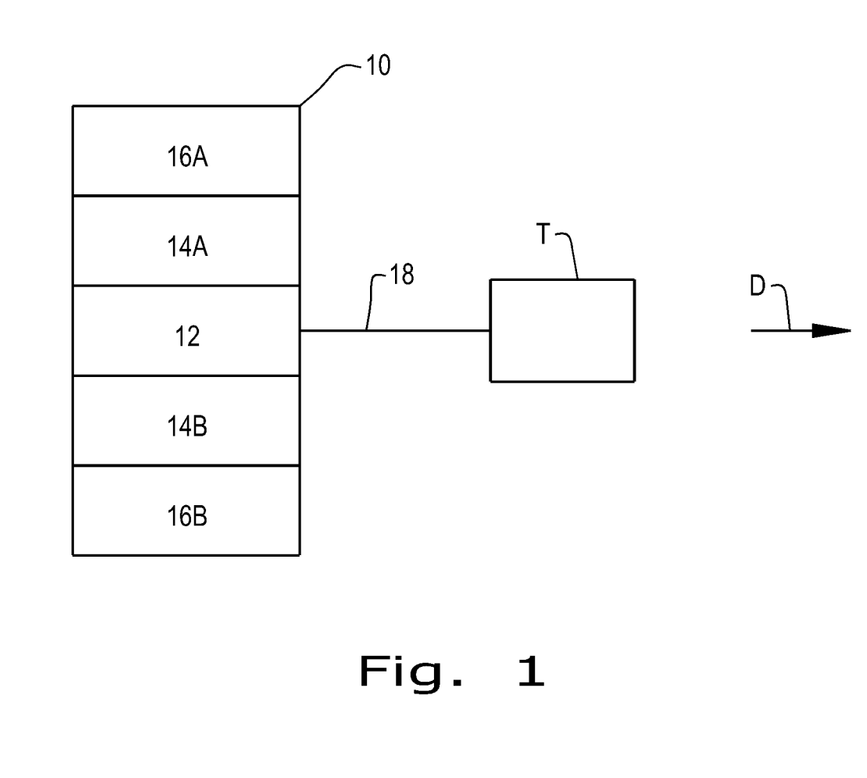
FIG. 1 is a top schematical view of an embodiment of an agricultural tillage implement of the present invention, in the form of a field cultivator, in an unfolded position being pulled by a tractor.
Figure 2:
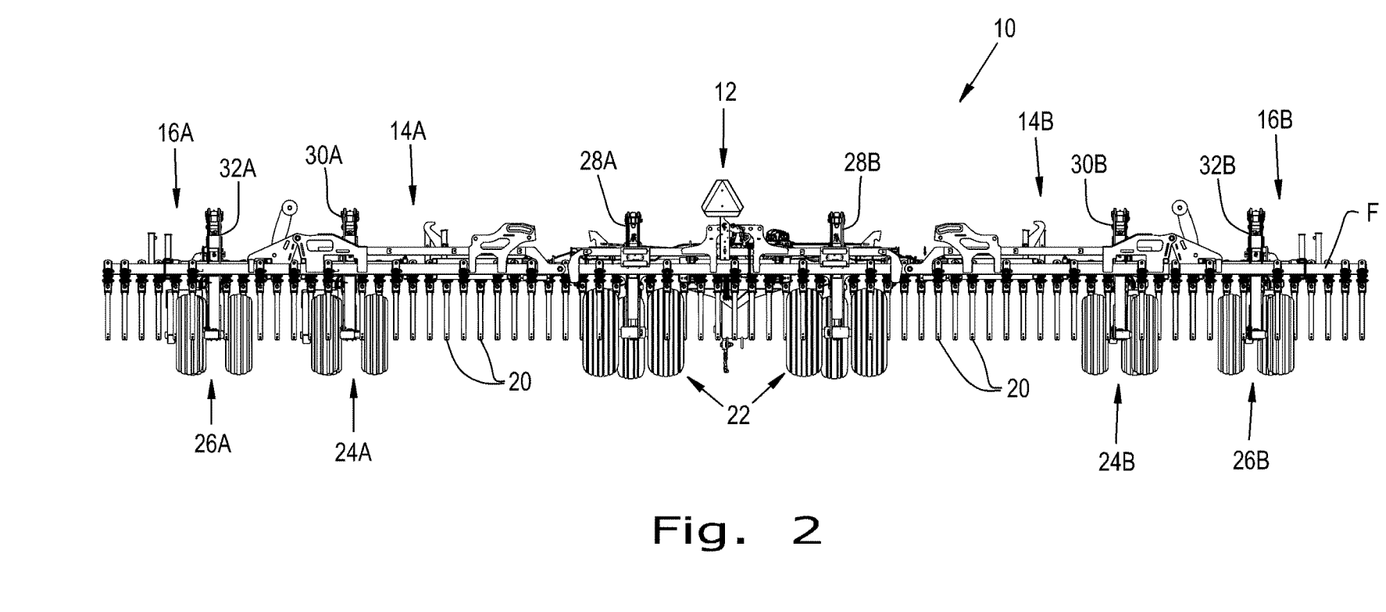
FIG. 2 is a rear view of the agricultural implement shown in FIG. 1.

Referring now to the drawings, and more particularly to FIGS. 1 and 2, there is shown an embodiment of a tillage implement of the present invention. In the illustrated embodiment, the tillage implement is in the form of a field cultivator 10 for tilling and finishing soil prior to seeding. Field cultivator 10 is being pulled by a tractor T in a travel direction D.

Field cultivator 10 is configured as a multi-section field cultivator, and includes a center frame section 12, also referred herein as a main section 12, and a plurality of wing sections 14 and 16. In the illustrated embodiment, field cultivator 10 has a dual-fold configuration with two left wing sections designated 14A and 16A, and two right wing sections designated 14B and 16B. Wing sections 14A and 14B are each inner wing sections, wing sections 16A and 16B are each outer wing sections. Throughout this application when the suffixes A and B are used they refer to a side of implement 10, and the use of the reference number absent the suffix is meant to refer to both the A and B sections.

Center frame section 12 is the center section that is directly towed by a traction unit, such as an agricultural tractor T. A pull hitch 18 extends forward from center frame section 12, and is coupled with the traction unit T in a known manner.

Sections 12-16 typically have cultivator shanks 20 coupled thereto for the cultivating or tilling of the ground. Each shank 20 may have a tilling portion; such as shovels at their lower ends for tilling the soil. Wheel assemblies 22 are coupled to main section 12 and are used for raising and lowering main section 12 with hydraulic lift cylinders or actuators 28A and 28B, during the tilling operation, and is used during the transport mode. In a similar manner actuators 30A and 30B are respectively coupled to wheel assemblies 24A and 24B, and actuators 32A and 32B are coupled to wheel assemblies 26A and 26B.

During use, it is periodically necessary to move implement 10 from a ground engaging mode where shanks 20 are lowered and make contact with the soil to an elevated mode (as seen in FIG. 2) with shanks 20 raised from the soil, which can also be referred to as a headland mode. The transition to headland mode is accomplished by actuating actuators 28, 30 and 32 thus extending wheel assemblies 22, 24 and 26 to thereby raise the frames of implement 10 and shanks 20 thereby. While in a headland mode, implement 10 is usually turned to go in an opposite direction to continue a field operation. Once the turn in completed then actuators 28, 30 and 32 are retracted to a controlled position to control the depth that shanks 20 engage the soil in the ground engaging mode.

Implement 10 can also transition from an unfolded orientation, as shown in FIG. 2, to a transport orientation which is a folded position. To fold implement 10, first, each outer wing section 16A and 16B is folded laterally inward and over a respective inner wing section 14A and 14B. With the outer wing sections 16A and 16B in the folded state, each inner wing section 14A and 14B is then folded.

Whether or not implement 10 is a folding implement, actuators 28, 30 and 32 are used to elevate implement 10 and to regulate the depth that shanks 20 engage the soil.

Figure 3:
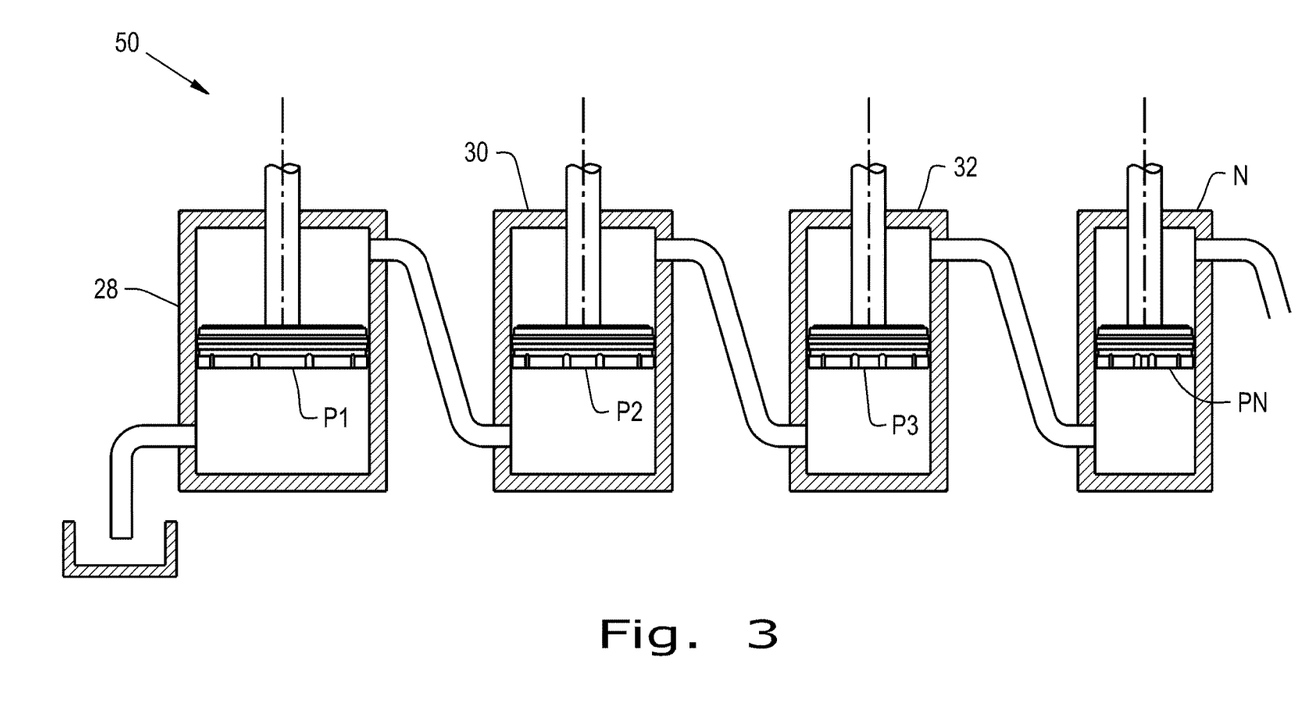
FIG. 3 is a schematical representation of a series hydraulic system in use on the implement of FIGS. 1 and 2.

Now, additionally referring to FIG. 3, there is shown actuators 28, 30, 32, and N that schematically represent a serial connected hydraulic system 50. Relative to implement 10, actuators 28-N can represent one or more serial systems that are used to extend wheel assemblies 22, 24 and 26 or actuators 28-N can represent the movement of some other part of implement 10, where the use of serially linked actuators is desirable.

Figure 4:
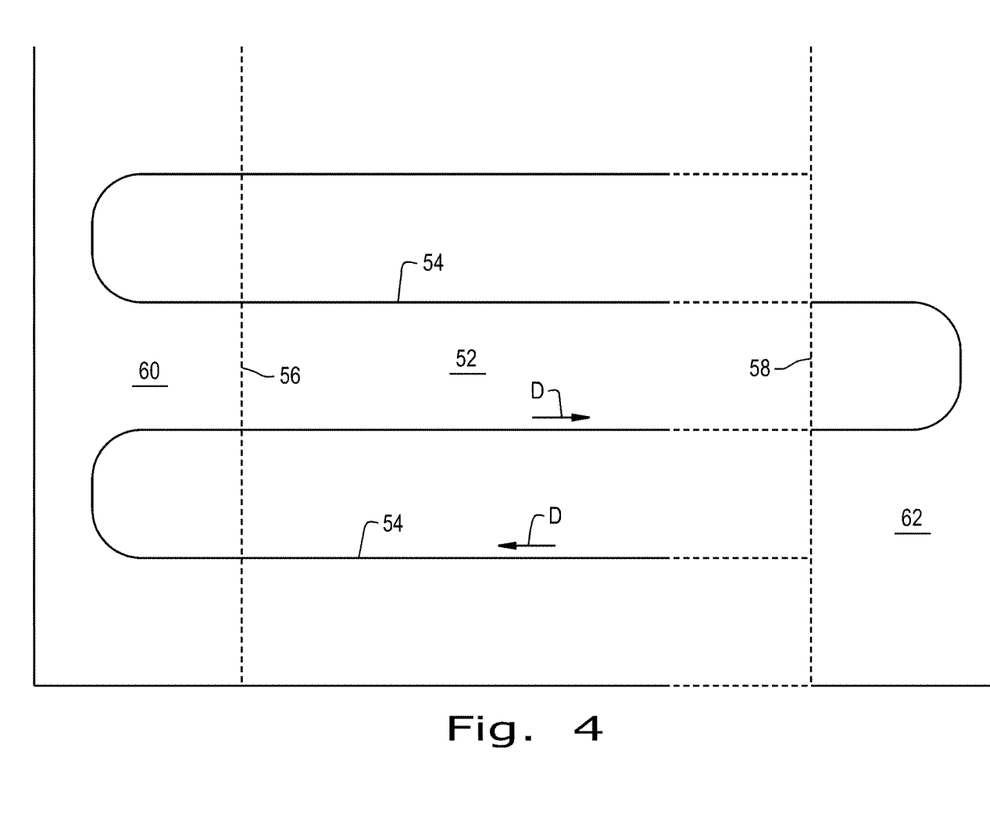
FIG. 4 is a schematical representation of a travel path of the implement of FIGS. 1 and 2.

Now, additionally referring to FIG. 4, there is schematically shown a field 52 having an implement travel path 54 and headland boundaries 56 and 58, which respectively define headland areas 60 and 62 to the left and right of boundaries 56 and 58. As implement 10 travels in direction D along path 54 implement 10 will cross boundary 56 and implement 10 will transition to the headland mode with actuators 28-N being actuated. As implement 10 is turned to go in an opposite direction, implement 10 transitions from the headland mode to the ground engaging mode as implement 10 leaves headland area 60. In a like manner as implement 10 reaches headland area 62 a similar set of actions take place as implement 10 again changes direction.

Figure 5:
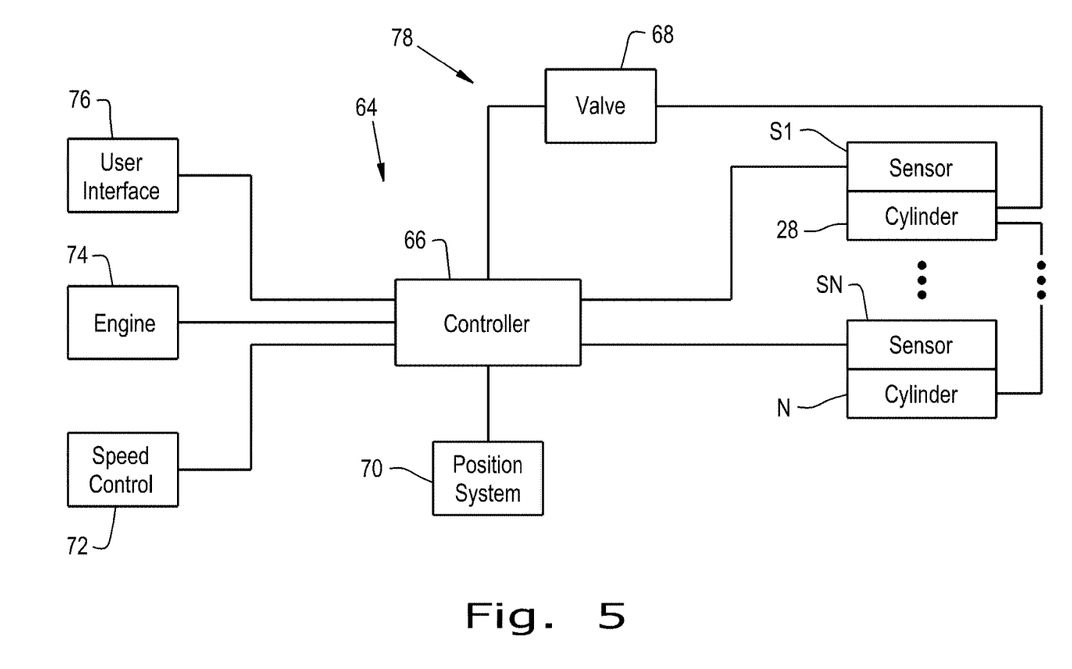
FIG. 5 is a schematical block diagram of a control system that operates the hydraulic system of FIG. 3 on the agricultural implement of FIGS. 1 and 2.
Figure 6:
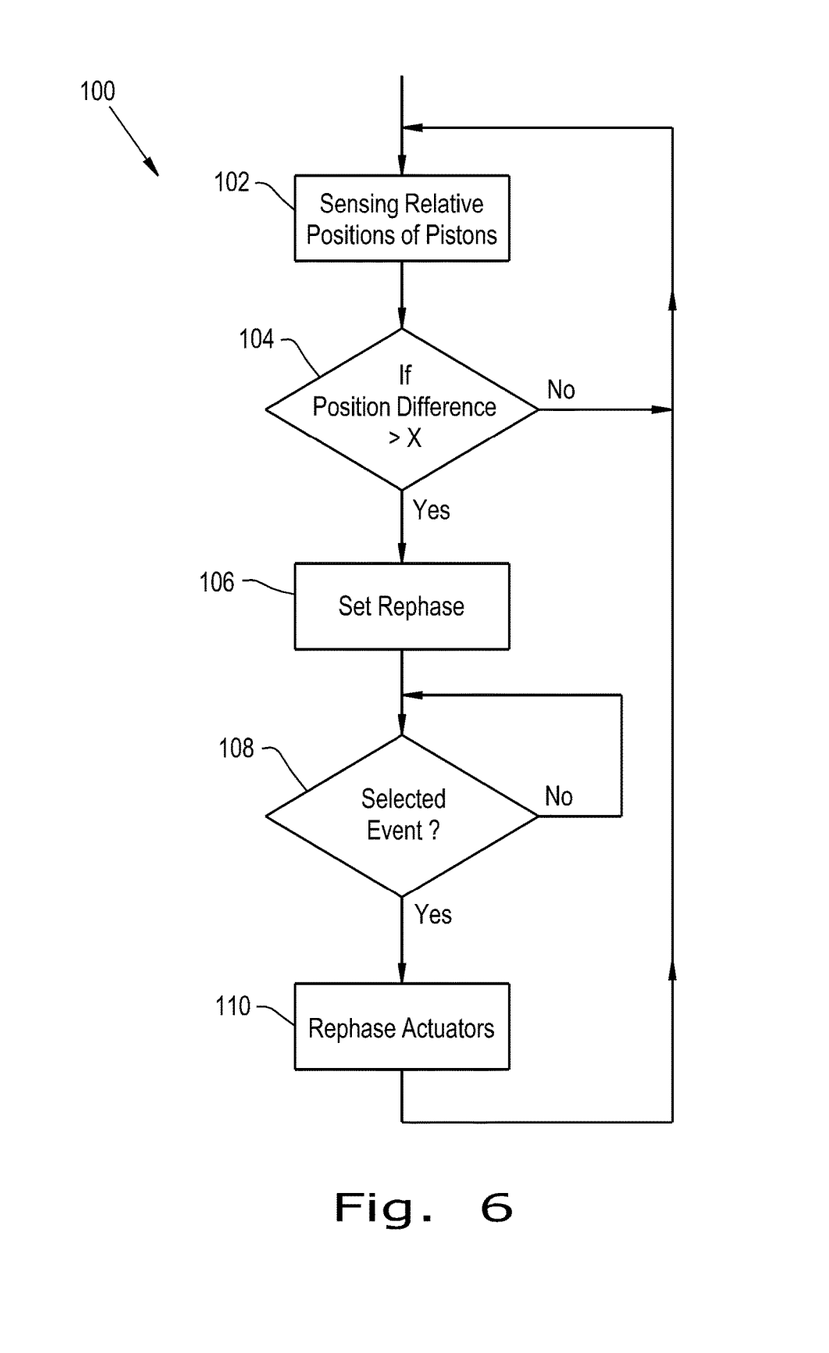
FIG. 6 is a flowchart depicting a method used by the control system of FIG. 5.

Referring now to FIGS. 5 and 6, there is shown a control system 64 having a controller 66, and a valve 68. Controller 66 is in communication with a position system 70, a speed control 72, an engine 74 of tractor T, and a user interface 76 located in a cab of tractor T. Sensors S1 though SN are coupled to actuators or cylinders 28 through N. Sensor S1-SN can be positional sensors that sense the actual position of pistons P1-PN and can determine the relative differences in the positions. Controller 66 executes method 100 and receives positional information or signals representative of the positions of pistons P1-PN at step 102. At step 104, if the relative positions of pistons P1-PN differ above a predetermined value X, which may be user selectable, then method 100 proceeds to step 106. A flag may be set in a memory location under the control of controller 66, which indicates that a rephasing of actuators 28-N should be undertaken and a message to that effect is sent to user interface 76. The initiation of the rephasing is delayed at step 108 until a selected event occurs at step 108. The selected event can be the operator indicating, on user interface 76, that the rephasing should take place. Another selected event can be the initiation of a transition to a headland mode of implement 10. Yet another selected event can be the location by position system 70 (which may be a GPS system) that a headland area 60 or 62 has been entered. The occurrence of the selected event at step 108 causes method 100 to advance to step 110, and actuators 28-N undergo a rephasing operation with actuators 28-N being fully extended. When actuators 28-N are fully extended the hydraulic fluid is allowed to pass, to some extent, past pistons P1-PN so that the fluid is proportioned to reflect the fully extended positions of pistons P1-PN. The extended position may be held for a predetermined time, such as approximately 5 seconds.

Sensors S1-SN can be proximity sensors rather than sensors that measure the actual positions of pistons P1-PN throughout their entire travel. The triggering of the proximity sensors then serves to give relative position information about pistons P1-PN to controller 66, and method 100 can be executed with that information.

In one embodiment of the invention agricultural implement 10 includes a frame F, a hydraulic system 78, a controller 66 and a plurality of sensors S1-SN. The hydraulic system 78 is coupled to the frame F and has a plurality of hydraulic actuators 28-N fluidically coupled in a series arrangement. The controller 66 is in control of the hydraulic system 78. The plurality of sensors S1-SN have at least one sensor coupled to each of the plurality of hydraulic actuators 28-N. The sensors S1-SN are in communication with the controller 66, with the controller executing the steps of receiving at least one signal 102 from the sensors S1-SN indicating a need to rephase the hydraulic actuators; and operating the hydraulic system 78 to rephase 110 the hydraulic actuators 28-N dependent upon the signal.

In another embodiment of the invention the agricultural implement 10 includes a frame F, a hydraulic system 78 and a controller 66. The hydraulic system 78 is coupled to the frame F. The hydraulic system 78 has a plurality of hydraulic actuators 28-N fluidically coupled in a series arrangement. The implement 10 has a transport mode, a headland mode and a ground engaging mode. The controller 66 is in control of the hydraulic system 78, and executes the steps of detecting 108 that the implement 10 is in the transport mode or the headland mode; and operating 110 the hydraulic system 78 to rephase the hydraulic actuators dependent upon the detection of the transport mode or the headland mode in the detecting step 108.

Series hydraulic systems, due to the leakage of hydraulic fluid from one cylinder to another, cause the cylinders to be in different positions, commonly called "out of phase". From time to time, the operator of the hydraulic system must extend the cylinders and hold the extended position allowing the bypass groves of the pistons or cylinders to "rephase" the cylinders. Sensors S1-SN may be in the form of position depth sensors associated with each of the cylinders or relative to frame F, which can detect an out of phase condition and thus the need for rephasing.

Position sensors S1-SN, located at each cylinder 28-N, indicates when cylinders 28-N are out of phase and signals to user interface 76 in the cab, that implement 10 is out of phase. The operator can stop and take corrective action, in the form of rephasing, or this can be done automatically. The present invention also provides for the rephasing to wait (see step 108) and automatically be done at headland turns in headland areas 60 or 62. Once the system 64 knows it needs to rephase, and the operator lifts implement 10 for the headland turn, then controller takes the initiative to rephase actuators 28-N.

If rephasing is not completed by the end of headland turn (when the operator moves to lower implement 10 back into the ground in the ground engaging mode) the tractor T will stop, thus halting the primary task, and let the phasing operation complete. Once complete, tractor T automatically (or from a resume signal from the operator) lowers implement 10 and continues forward with the primary task of the agricultural operation, such as engaging and moving soil. With GPS field maps, the lifting and lowering can be automatic so that as implement 10 reaches headland areas 60 or 62, the rephasing, if needed, is carried out during the turn operation.

Indications of a need to "rephase" actuators 28-N is displayed on user interface 76 and the automatic rephase of cylinders 29-N takes place upon the lifting of implement 10 (normally at the headland 60 or 62). A tractor stopping feature is contemplated so that if the rephase is not completed and the tractor is prevented from moving, there is a manual restart button to continue tractor operations. Alternatively, this can be automatic if so desired.

It is also contemplated to use a limiting position sensor on just the outside cylinders N, as they normally show the most movement of cylinders due to leakage.

It is further contemplated that if that rather than a stop/start feature, controller 66 could use the hydraulic scrapper controls on tractor T, for auto correction.

When the cylinders 28-N should be rephased, the system automatically rephases (moves to transport position) when the operator indicates move to the headland position. If tractor T does not rephase in time to complete the headland turn, such as when the operator hits the depth resume button, the tractor stops, until rephasing is complete. Then the operator hits a tractor resume button to get tractor T moving again or tractor T can automatically resume on its own. The controls utilize ISOBusc3 tractor controls (stop/start). As an alternative, controller 66 of tractor T has knowledge of how long it takes to complete a headland turn (controller 66 records an average time between button hits between operating depth and headland), and slows tractor T down to match that rephasing time. Therefore, no need to stop and start tractor T, wherein the controls utilize ISOBusc3 tractor controls (speed control 72 and or engine 74) to accomplish the speed alteration.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
  a frame;
  a hydraulic system coupled to the frame, the hydraulic system having a plurality of hydraulic actuators fluidically coupled in a series arrangement;
  a controller in control of the hydraulic system; and
  a plurality of sensors with at least one sensor coupled to each of the plurality of hydraulic actuators, the sensors in communication with the controller, the controller executing the steps of:
    receiving at least one signal from the sensors indicating a need to rephase the hydraulic actuators;
    operating the hydraulic system to rephase the hydraulic actuators dependent upon the signal; and
    delaying the operating step until a selected event occurs, the selected event including a headland turn of the implement in a headland area.

2. The agricultural implement of claim 1, wherein the controller stops the implement from performing a primary task if the headland turn is completed and the operating step has not been completed.

3. The agricultural implement of claim 1, wherein the selected event additionally includes an operator initiated action.

4. The agricultural implement of claim 3, wherein the controller executes a step of informing an operator that a rephase action is needed and the operator initiated action is a confirmation signal to the controller from the operator.

5. The agricultural implement of claim 3, wherein the operator initiated action is an activation of the hydraulic system that causes the implement to stop doing a primary task.

6. The agricultural implement of claim 2, wherein the primary task includes moving of soil.

7. The agricultural implement of claim 1, wherein the selected event additionally includes detecting a position of the implement.

8. The agricultural implement of claim 2, wherein the controller allows the implement to continue the primary task once the operating step is completed.

9. The agricultural implement of claim 8, wherein the operating step includes holding the actuators in a fully extended position for a predetermined amount of time.

* * * * *